United States Patent [19]

Sheridon et al.

[11] Patent Number: 6,055,091

[45] Date of Patent: Apr. 25, 2000

[54] TWISTING-CYLINDER DISPLAY

[75] Inventors: Nicholas K. Sheridon, Los Altos; Joseph M. Crowley, Morgan Hill, both of Calif.

[73] Assignee: Xerox Corporation, Stamford, Conn.

[21] Appl. No.: 08/716,672

[22] Filed: Sep. 13, 1996

Related U.S. Application Data

[60] Provisional application No. 60/020,651, Jun. 27, 1996, and provisional application No. 60/020,522, Jun. 27, 1996.

[51] Int. Cl.[7] .................................................. G02B 26/00
[52] U.S. Cl. .......................................... 359/296; 345/107
[58] Field of Search .................................... 359/296, 298, 359/299, 316; 345/107, 108; 349/117

[56] References Cited

U.S. PATENT DOCUMENTS

Re. 29,742  8/1978  Tung ........................................... 2/412
2,326,634   8/1943  Gebhard et al. .

(List continued on next page.)

FOREIGN PATENT DOCUMENTS 2 161 301   6/1973   France .
40 08 825   3/1991   Germany .

OTHER PUBLICATIONS

Lawrence L. Lee, "A Magnetic Particles Display", *IEEE Transactions on Electron Devices*, vol. ED 22, No. 9, Sep. 1975, pp. 758–765.

Richard A. Strain, "Additive Color Mixture with Fluorescent Pigments and Special Illumination", *Color Research and Applications*, vol. 1, No. 3, Fall 1976, pp. 146–147.

N. K. Sheridon and M. A. Berkowitz, "The Gyricon—A Twisting Ball Display", *Proceedings of the S. I. D*, vol. 18/3 & 4, 1977, pp. 289–293.

A. Chiang, D. Curry and M. Zarzycki," A Stylus Writable Electrophoretic Display Device", *S.I.D. 79 Digest*, 1979, pp. 44–45.

M. Saitoh, T. Mori, R. Ishikawa and H. Tamura, "A Newly Developed Electrical Twisting Ball Display", *Proceeding of the SID*, vol. 23, No. 4, 1982, pp. 249–250.

R. Micheletto, H. Fukada and M. Ohtsu, "A Simple Method for the Production of a Two–Dimentional, Ordered Array of Small Latex Particles", *Langmuir*, vol. 11, No. 9, May, 1995, pp. 3333–3336.

Deane B. Judd and Günter Wyszecki, *Color in Business, Science and Industry* (2nd ed.), New York: John Wiley and Sons, Inc., 1967, pp. 387–405.

Wesley Wm. Wendlandt and Harry G. Hecht, *Reflectance Spectroscopy*, New York: Interscience Publishers, 1966, pp. 46–91, 253–275.

(List continued on next page.)

*Primary Examiner*—Loha Ben
*Attorney, Agent, or Firm*—Nola Mae McBain; Alexander E. Silverman

[57] ABSTRACT

A gyricon or twisting-particle display based on nonspheroidal (e.g., substantially cylindrical) optically anisotropic particles disposed in a substrate. The particles can be bichromal cylinders, preferably aligned parallel to one another and packed close together in a monolayer. A rotatable disposition of each particle is achievable while the particle is thus disposed in the substrate; for example, the particles can already be rotatable in the substrate, or can be rendered rotatable in the substrate by a nondestructive operation performed on the substrate. In particular, the substrate can be made up of an elastomer that is expanded by application of a fluid thereto so as to render the particles rotatable therein. A particle, when in its rotatable disposition, is not attached to the substrate. The close-packed monolayer configuration of particles provides excellent brightness characteristics and relative ease of manufacture as compared with certain other high-brightness gyricon displays. The substrate containing the cylinders can be fabricated with the swelled-elastomer techniques known from spherical-particle gyricon displays, with a simple agitation process step being used to align the cylinders within the sheeting material. Techniques for fabricating the cylinders are also disclosed.

22 Claims, 11 Drawing Sheets

U.S. PATENT DOCUMENTS

| | | | |
|---|---|---|---|
| 2,354,018 | 7/1944 | Heltzer et al. | 88/82 |
| 2,354,048 | 7/1944 | Palmquist | 40/135 |
| 2,354,049 | 7/1944 | Palmquist | 40/135 |
| 2,407,680 | 9/1946 | Palmquist et al. | 88/82 |
| 2,600,963 | 6/1952 | Bland | 49/58 |
| 2,684,788 | 7/1954 | Bland | 222/177 |
| 2,794,301 | 6/1957 | Law et al. | 49/84 |
| 2,950,985 | 8/1960 | Duval d'Adrian | 117/33 |
| 2,965,921 | 12/1960 | Bland | 18/2.5 |
| 2,980,547 | 4/1961 | Duval d'Adrian | 106/47 |
| 3,150,947 | 9/1964 | Bland | 65/21 |
| 3,222,204 | 12/1965 | Weber et al. | 117/17 |
| 3,243,273 | 3/1966 | Bland | 65/21 |
| 3,310,391 | 3/1967 | Law | 65/21 |
| 3,617,333 | 11/1971 | Brown | 117/35 R |
| 3,648,281 | 3/1972 | Dahms et al. | 340/373 |
| 3,795,435 | 3/1974 | Schwab | 350/105 |
| 3,915,771 | 10/1975 | Gatzke et al. | 156/71 |
| 4,002,022 | 1/1977 | Lopez | 58/126 R |
| 4,082,426 | 4/1978 | Brown | 350/105 |
| 4,117,192 | 9/1978 | Jorgensen | 428/337 |
| 4,117,194 | 9/1978 | Barbe et al. | 428/74 |
| 4,126,854 | 11/1978 | Sheridon | 340/373 |
| 4,143,103 | 3/1979 | Sheridon | 264/4 |
| 4,229,732 | 10/1980 | Hartstein et al. | 340/378 |
| 4,261,653 | 4/1981 | Goodrich | 350/362 |
| 4,267,946 | 5/1981 | Thatcher | 222/345 |
| 4,288,788 | 9/1981 | Rogers et al. | 340/378 |
| 4,367,920 | 1/1983 | Tung et al. | 350/105 |
| 4,381,616 | 5/1983 | Saxer | 40/502 |
| 4,438,160 | 3/1984 | Ishikawa et al. | 427/214 |
| 4,441,791 | 4/1984 | Hornbeck | 350/360 |
| 4,492,435 | 1/1985 | Banton et al. | 350/360 |
| 4,511,210 | 4/1985 | Tung et al. | 350/105 |
| 4,569,857 | 2/1986 | Tung et al. | 427/163 |
| 4,592,628 | 6/1986 | Altman et al. | 350/486 |
| 4,678,695 | 7/1987 | Tung et al. | 428/120 |
| 4,710,732 | 12/1987 | Hornbeck | 332/7.51 |
| 4,713,295 | 12/1987 | Laroche | 428/406 |
| 4,721,649 | 1/1988 | Belisle et al. | 428/235 |
| 4,725,494 | 2/1988 | Belisle et al. | 428/325 |
| 4,948,232 | 8/1990 | Lange | 350/334 |
| 4,956,619 | 9/1990 | Hornbeck | 330/4.3 |
| 5,039,557 | 8/1991 | White | 427/137 |
| 5,128,203 | 7/1992 | LaRoche | 428/325 |
| 5,155,607 | 10/1992 | Inoue et al. | 359/51 |
| 5,226,099 | 7/1993 | Mignardi | 385/19 |
| 5,262,098 | 11/1993 | Crowley et al. | 264/8 |
| 5,315,776 | 5/1994 | Strawbridge et al. | 40/505 |
| 5,331,454 | 7/1994 | Hornbeck | 359/224 |
| 5,344,594 | 9/1994 | Sheridon | 264/4.1 |
| 5,389,945 | 2/1995 | Sheridon | 345/85 |
| 5,416,996 | 5/1995 | Clemens et al. | 40/502 |
| 5,459,602 | 10/1995 | Sampsell | 359/234 |
| 5,515,075 | 5/1996 | Nakagiri et al. | 345/111 |
| 5,526,016 | 6/1996 | Nakagiri et al. | 345/111 |
| 5,535,047 | 7/1996 | Hornbeck | 359/295 |
| 5,894,367 | 4/1999 | Sheridon | 359/296 |

OTHER PUBLICATIONS

G. Chui, "A Page from the Future", San Jose Mercury News, Jun. 18, 1996, pp. 12E, 11E.

J. L. Bruneel and F. Micherson, "Optical Display Device Using Bistable Electrets," *American Institute of Physics*, vol. 30, No. 8, Apr. 15, 1977, pp. 382–383.

Robert L. Saxe and Robert I. Thompson, "Suspended–Particle Devices", *Information Display*, Nos. 4&5, 1996, pp. 20–23.

Lars A. Yoder, "The TI Digital Light Processing Micromirror Tech: Putting It To Work Now", *Advanced Imaging*, Jun. 1996, pp. 43–46.

PCT International Search Report, Int'l. Appl. No. US 97/10123, Int'l Filing Date Jun. 25, 1997.

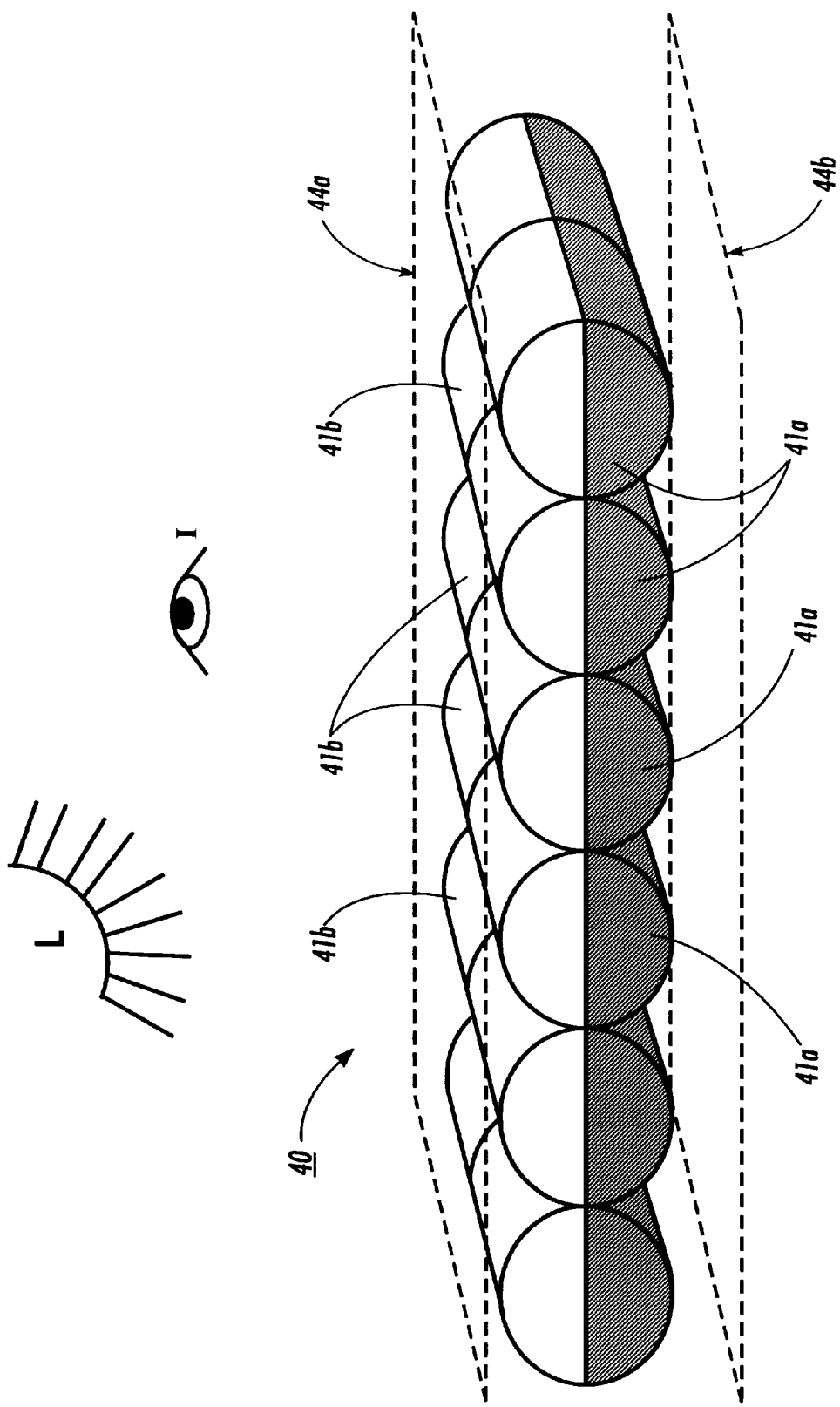

TWISTING-CYLINDER DISPLAY

PRIORITY APPLICATION

THIS APPLICATION claims priority from the following U.S. provisional applications having the same assignee and at least one common inventor: No. 60/020,651, filed Jun. 27, 1996; and No. 60/020,522, also filed Jun. 27, 1996.

INCORPORATION BY REFERENCE

The following U.S. patents are fully incorporated herein by reference: U.S. Pat. No. 4,126,854, (Sheridon, "Twisting Ball Panel Display"); U.S. Pat. No. 4,143,103 (Sheridon, "Method of Making a Twisting Ball Panel Display"); U.S. Pat. No. 5,262,098 (Crowley et al., "Method and Apparatus for Fabricating Bichromal Balls for a Twisting Ball Display"); U.S. Pat. No. 5,344,594 (Sheridon, "Method for the Fabrication of Multicolored Balls for a Twisting Ball Display"); and U.S. Pat. No. 5,389,945 (Sheridon, "Writing System Including Paper-Like Digitally Addressed Media and Addressing Device Therefor").

RELATED PATENT APPLICATIONS

The following coassigned U.S. Patents are related to this case: U.S. Pat. No. 5,754,332, (Crowley, "Monolayer Gyricon Disply ") U.S. Pat. No. 5,808,783 (Crowley, "High Reflectance Gyricon Display ") U.S. Pat.No. 5,914,805 (Crowley, "Gyricon Display with Interstitially Packed Particles ") Arrays"; and U.S. Pat. No. 5,825,529 (Crowley, "Gyricon Display with NO Elastomer Substrate.")

BACKGROUND OF THE INVENTION

The invention pertains to visual displays and more particularly to twisting-ball displays, such as gyricon displays and the like.

Gyricon displays, also known by other names such as electrical twisting-ball displays or rotary ball displays, were first developed over twenty years ago. See U.S. Pat. No. 4,126,854 and No. 4,143,103, incorporated by reference hereinabove.

An exemplary gyricon display 10 is shown in side view in FIG. 1A (PRIOR ART). fnBichromal bails 1 are disposed in an elastomer substrate 2 that is swelled by a dielectric fluid creating cavities 3 in which the balls 1 are free to rotate. The balls 1 are electrically dipolar in the presence of the fluid and so are subject to rotation upon application of an electric field, as by matrixaddressarle electrodes 4a, 4b. The electrode 4a closest to upper surface 5 is preferably transparent. An observer at I sees an image formed by the black and white pattern of the balls 1 as rotated to expose their black or white faces (hemispheres) to the upper surface 5 of substrate 2.

A single one of bichromal balls 1, with black and white hemispheres 1a and 1b, is shown in FIG. 1B (PRIOR ART).

Gyricon displays have numerous advantages over conventional electrically addressable visual displays, such as LCD and CRT displays. In particular, they are suitable for viewing in ambient light, retain an image indefinitely in the absence of an applied electric field, and can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reuseable (and thus environmentally friendly) substitute for ordinary paper. For further a dvantages of the gyricon, see U.S. Pat. No. 5,389,945, incorporated by reference hereinabove.

Known gyricon displays employ spherical particles (e.g., bichromal balls) as their fundamental display elements. There are good reasons for using spherical particles. In particular:

Spherical bichromal balls can be readily manufactured by a number of techniques. See the '098 and '594 patents, incorporated by reference hereinabove, in this regard.

Spheres are symmetrical in three dimensions. This means that fabrication of a gyricon display sheet fro m spherical particles is straighforward. It is only necessary to disperse the balls throughout an elastomer substrate, which is then swelled with dielectric fluid to form spherical cavities around the balls. The spherical balls can be placed anywhere within the substrate, and at any orientation with respect to each other and with respect to the substrate surface. There is no need to align the balls with one another or with the substrate surface. Once in place, a ball is free to rotate about any axis within its cavity.

Indeed, there would seem to be no reason to consider using anything other than spherical particles as the rotational elements of gyricon displays.

And so, nobody has-until now.

SUMMARY OF THE INVENTION

The invention provides a gyricon display having cylindrical, rather than spherical, rotating elements. The elements can be bichromal cylinders, preferably aligned parallel to one another and packed close together in a monolayer. The close-packed monolayer configuration provides excellent brightness characteristics and relative ease of manufacture as compared with certain other high-brightness gyricon displays. The bichromal cylinders can be fabricated by techniques that will be disclosed. The substrate containing the cylinders can be fabricated with the swelled-elastomer techniques known from spherical-particle gyricon displays, with a simple agitation process step being used to align the cylinders within the sheeting material.

Further, the invention is well-suited to providing a gyricon display having superior reflectance characteristics comparing favorably with those of white paper. A gyricon display is made with a close-packed monolayer of cylinders, wherein cylinders are placed, preferably in a rectangular packing arrangement, so that the surfaces of adjacent cylinders are as close to one another as possible. The light reflected from the inventive gyricon display is reflected substantially entirely from the monolayer of cylinders, so that lower layers are not needed. The areal coverage fraction obtainable with cylinders is greater than that obtainable with a single monolayer of uniform-diameter spheres.

In one aspect, the invention provides a material comprising a substrate and a plurality of nonspheroidal (e.g., substantially cylindrical) optically anisotropic particles disposed in the substrate. A rotatable disposition of each particle is achievable while the particle is thus disposed in the substrate; for example, the particles can already be rotatable in the substrate, or can be rendered rotatable in the substrate by a nondestructive operation performed on the substrate. In particular, the substrate can be made up of an elastomer that is expanded by application of a fluid thereto so as to render the particles rotatable therein. A particle, when in its rotatable disposition, is not attached to the substrate. A display apparatus can be constructed from a piece of the material together with means (such as an electrode assembly) for facilitating a rotation of at least one particle rotatably disposed in the substrate of the piece of material.

In another aspect, the invention provides a material comprising a substrate having a surface and a plurality of nonspheroidal optically anisotropic particles disposed in the substrate substantially in a single layer. The particles (e.g., cylinders) are of a substantially uniform size characterized by a linear dimension d (e.g., diameter). Each particle has a center point, and each pair of nearest neighboring particles in the layer is characterized by an average distance D therebetween, the distance D being measured between particle center points. A rotatable disposition of each particle is achievable while the particle is thus disposed in the substrate. A particle, when in its rotatable disposition, is not attached to the substrate. Particles are sufficiently closely packed with respect to one another in the layer such that the ratio of the union of the projected areas of the particles to the area of the substrate surface exceeds the areal coverage fraction that would be obtained from a comparably situated layer of spheres of diameter d disposed in a hexagonal packing arrangement with an average distance D therebetween as measured between sphere centers. If the ratio D/d is made as close to 1.0 as practicable, the ratio of the union of the projected areas of the particles to the area of the substrate surface can be made to exceed the maximum theoretically possible areal coverage fraction for a maximally close-packed hexagonal packing geometry of a layer of spheres of diameter d, which is approximately equal to 90.7 percent.

The invention will be better understood with reference to the following description and accompanying drawings, in which like reference numerals denote like elements.

BRIEF DESCRIPTION OF THE DRAWINGS

FIG. 4 illustrates bichromal cylinders arrayed in an ideal close-packed monolayer;

DETAILED DESCRIPTION

In a preferred embodiment of the invention, bichromal cylinders are arranged in a close-packed planar monolayer, as close to one another as possible, so as to cover the plane of the monolayer. The advantages of a close-packed monolayer, display are discussed at length in copending, coassigned U.S. Pat. No. 5,754,332 entitled "Monolayer Gyricon Displays"; suffice it to say here that close-packed monolayer displays exhibit superior reflectance and brightness characteristics as compared with conventional gyricon displays, and that the more of the monolayer plane that is covered by the gyricon elements, the better the reflectance and the brighter the di splay.

To quote briefly from U.S. Pat. No. 5,754,332 "In the 'white' state, the inventive display reflects entirely from the topmost layer of bichromal balls and, more particularly, from the white hemispherical upper surfaces of the topmost layer of balls. In a preferred embodiment, the inventive display is constructed with a single close-packed monolayer of bichromal balls."

Ideally, a close-packing arrangement according to U.S. Pat. No. 5,754,332 would entirely cover the plane with the monolayer of gyricon elements. However, the displays disclosed in U.S. Pat. No. 5,754,332 are all based on spherical balls of the prior art. Inasmuch as a planar array of spheres cannot fully cover the plane, but must necessarily contain interstices, the best that can be achieved with a single population of uniform-diameter spherical elements is about 90.7 percent a real coverage, which is obtained with a hexagonal packing geometry. A second population of smaller balls can be added to fill in the gaps somewhat, but this complicates display fabrication and results in a tradeoff between light losses due to unfilled interstices and light losses due to absorption by the black hemispheres of the smaller interstitial balls.

The present invention provides a close-packed monolayer gyricon display in which a real coverage can approach 100 percent, without any need for interstitial particles. It does so by using cylindrical rather than spherical bichromal elements. For example, a rectangular planar monolayer array of cylinders can be constructed that entirely or almost entirely covers the plane. With the white faces of the cylinders exposed to an observer, little if any light can get through the layer.

Figure 1A:
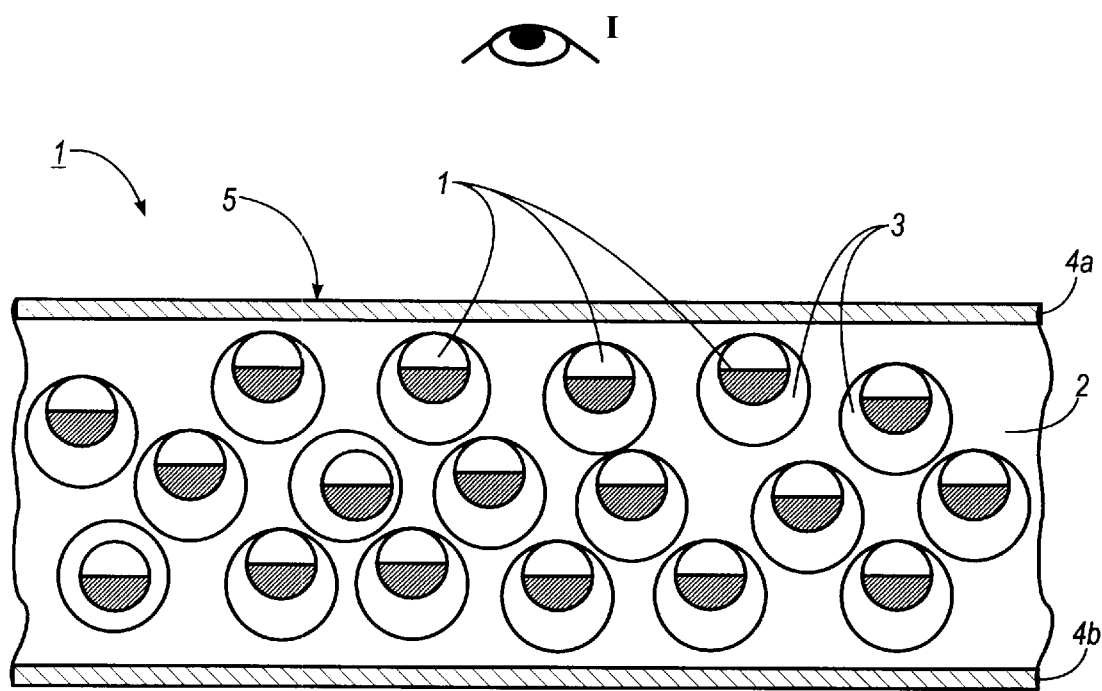
FIG. 1A is an exemplary gyricon display of the PRIOR ART, incorporating bichromal balls.
Figure 1B:
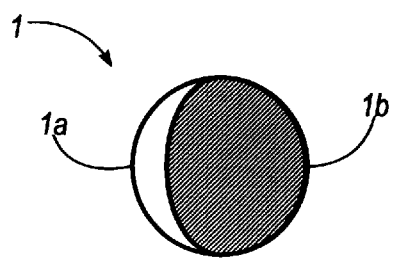
FIG. 1B illustrates a spherical bichromal ball of the PRIOR ART.
Figure 2:
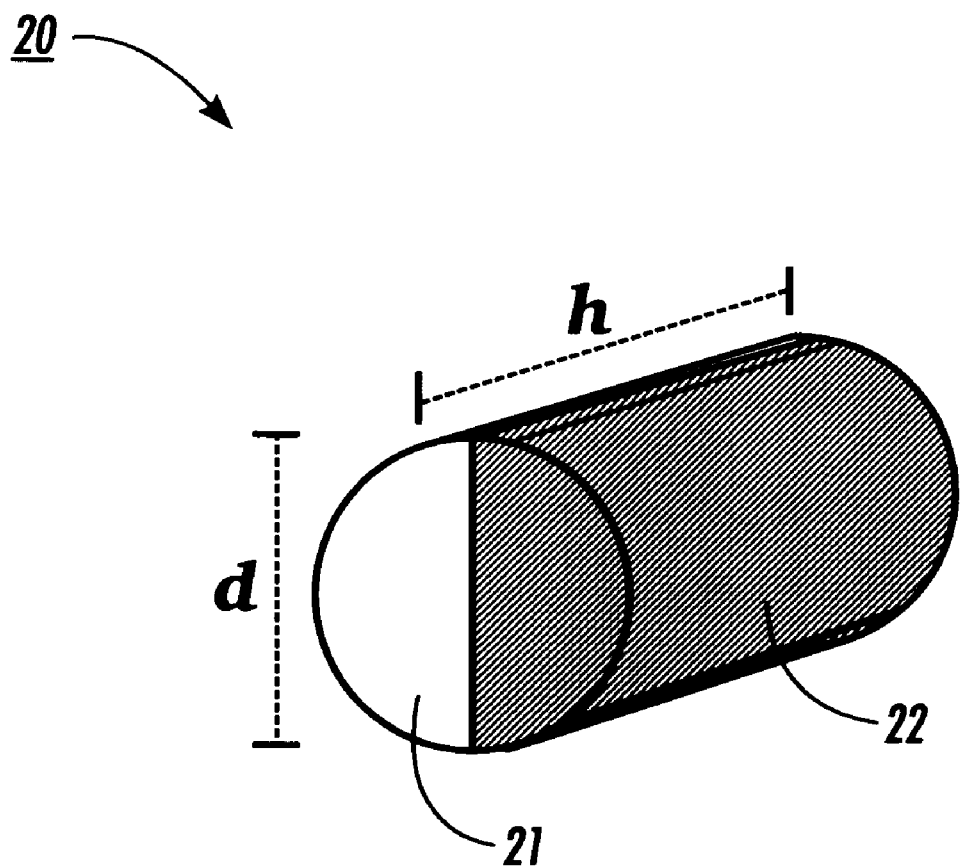
FIG. 2 illustrates a bichromal cylinder, showing in particular the diameter and height thereof.

FIG. 2 illustrates a bichromal cylinder 20 suitable for use as a rotating element of the inventive gyricon display. Cylinder 20 has white face 21 and black face 22. Cylinder 20 is of height (or length) h and has diameter d. The aspect ratio of cylinder 20 is defined herein as the ratio h/d. In the presence of a dielectric fluid, cylinder 20 is electrically dipolar, with the dipole moment preferably oriented perpendicular to the plane separating the white and black portions of the cylinder and passing perpendicularly through the longitudinal axis of the cylinder.

Figure 3:
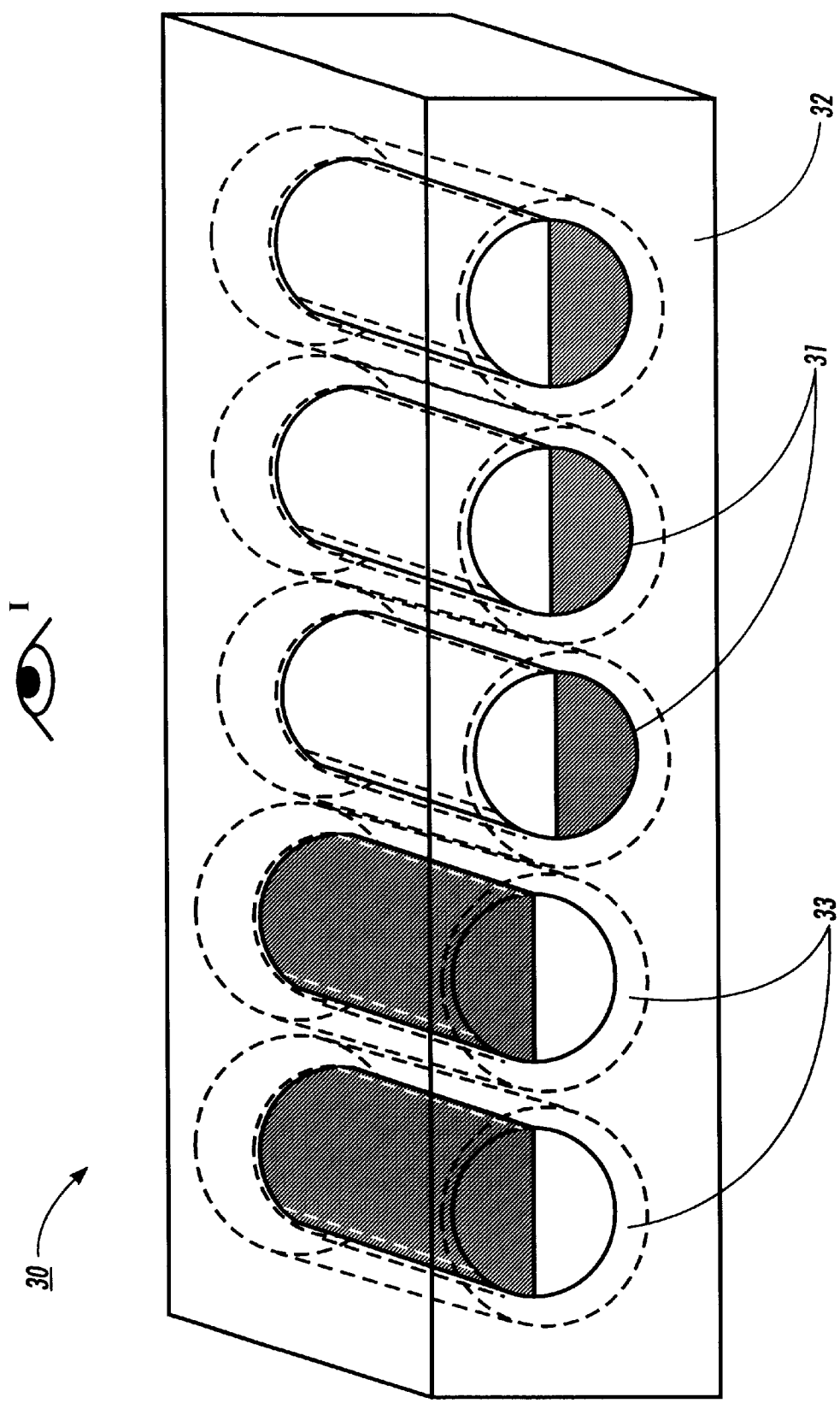
FIG. 3 illustrates bichromal cylinders in cavities in an elastomer substrate.

FIG. 3 illustrates how bichromal cylinders can be arranged in an elastomer substrate for use in the inventive display. A portion of a gyricon display 30 is shown. In display 30, bichromal cylinders 31 are disposed in an elastomer substrate 32 that is swelled by a dielectric fluid (not shown) creating cavities 33 in which the cylinders 31 are free to rotate about their respective longitudinal axes.

Cavities 33 are preferably not much larger in diameter than cylinders 31, so that cylinders 31 are constrained from rotating about their medial axes. Cylinders 31 are electrically dipolar in the presence of the dielectric fluid, and so are subject to rotation upon application of an electric field. As shown, cylinders 31 can be rotated so as to expose either their white or black faces to an observer at I.

FIG. 4 illustrates bichromal cylinders arrayed in a close-packed monolayer. A portion of a gyricon display 40 includes rows of bichromal cylinders 41a and 41b of uniform diameter. Cylinders 41a, 41b are disposed in a monolayer between the upper and lower surfaces 44a, 44b of display 40. Preferably there is exactly one cylinder between any given point on upper surface 44a and the corresponding point directly beneath it on lower surface 44b.

The white faces of cylinders 41a, 41b are shown turned towards transparent viewing surface 44a. In this configuration, light from a light source L incident on upper surface 44a is scattered by the white faces of cylinders 41a, 41b and is reflected so as to be visible to an observer at I. Thus display 40 appears white to the observer.

As shown, the cylinders are aligned end-to-end within the monolayer, the circular ends of cylinders 41a being aligned with the circular ends of cylinders 41b so that the longitudinal axis of each cylinder 41a is colinear with the longitudinal axis of its respective neigboring cylinder 41b. Further as shown, the cylinders are aligned side-to-side within the monolayer, so that the circumferences of neighboring cylinders 41a touch each other, and the circumferences of neighboring cylinders 41b likewise touch each other. Thus aligned end-to-end and side-to-side, the cylinders form a rectangular array, whose structure is observable from above (as by an observer at I) through surface 44a.

Preferably, there are no gaps between adjacent cylinders in the rectangular array. That is, the cylinders 41a, 41b touch each other end-to-end and side-to-side, or come as close as possible to touching each other as is consistent with proper cylinder rotation. Accordingly, there is preferably little or no opportunity for incident light from source L to be scattered from the white faces of the cylinders down to the black faces, where it would be absorbed. Likewise, there is little or no opportunity for incident light to pass between adjacent cylinders, where it would be absorbed in or below lower surface 44b.

Figure 5A:
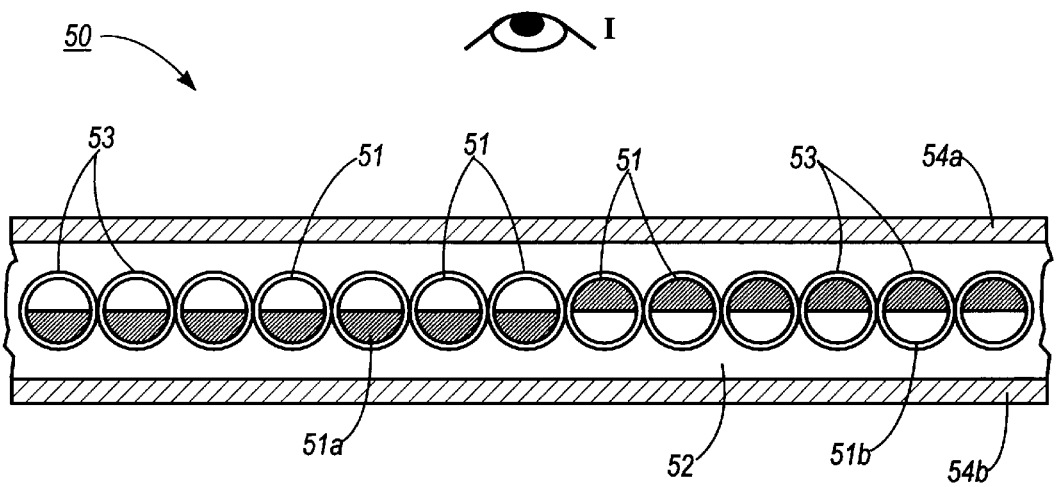
FIGS. 5A–5B are, respectively, side and top views of a gyricon display of the present invention in an embodiment wherein bichromal cylinders of unit (1:1) aspect ratio are arrayed in a monolayer configuration.
Figure 5B:
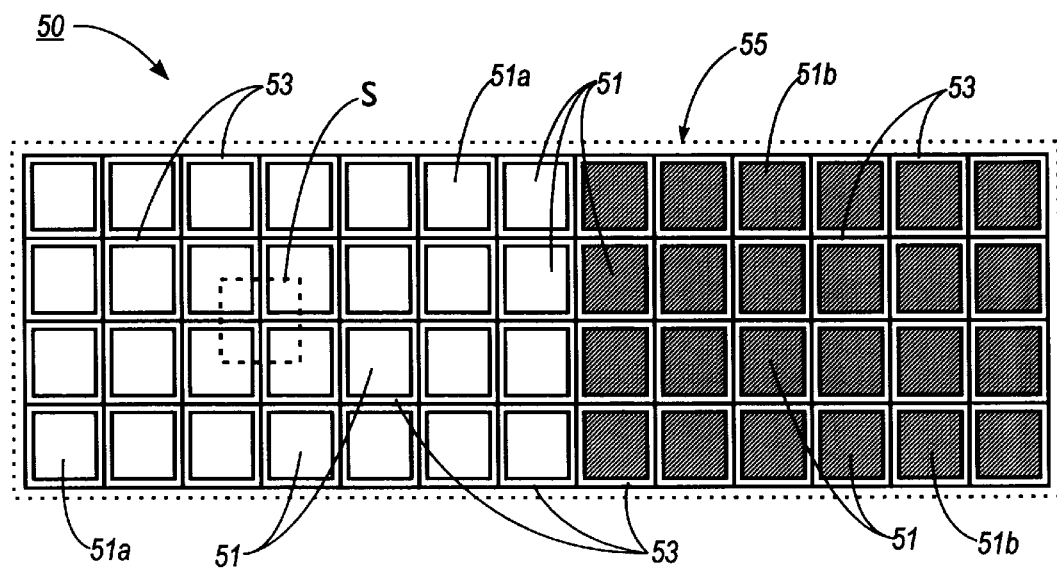

FIGS. 3-4 depict their respective gyricon displays in simplified form, with details not pertinent to the discussion omitted for clarity. FIGS. 5A and 5B provide, respectively, more detailed side and top views of a gyricon display 50 of the invention in a specific embodiment.

In display 50, bichromal cylinders 51 of unit (that is, 1:1) aspect ratio are arrayed in a monolayer array having a rectangular packing geometry. Preferably, bichromal cylinders 51 are placed as close to one another as possible in the monolayer. Cylinders 51 are situated in elastomer substrate 52, which is swelled by a dielectric fluid (not shown) creating cavities 53 in which the cylinders 51 are free to rotate. The cavities 53 are made as small as possible with respect to cylinders 51, so that the cylinders nearly fill the cavities. Also, cavities 53 are placed as close to one another as possible, so that the cavity walls are as thin as possible. Preferably, cylinders 51 are of uniform diameter and situated at a uniform distance from upper surface 55. It will be appreciated that the arrangement of cylinders 51 and cavities 53 in display 50 minimizes both the center-to-center spacing and the surface-to-surface spacing between neighboring bichromal cylinders.

Cylinders 51 are electrically dipolar in the presence of the dielectric fluid and so are subject to rotation upon application of an electric field, as by matrixaddressable electrodes 54a, 54b. The electrode 54a closest to upper surface 55 is preferably transparent. An observer at I sees an image formed by the black and white pattern of the cylinders 51 as rotated to expose their black or white faces to the upper surface 55 of substrate 52. For example, the observer sees the white faces of cylinders such as cylinder 51a and the black faces of cylinders such as cylinder 51b.

The side view FIG. 5A reveals the monolayer construction of display 50. The top view of FIG. 5B illustrates the rectangular packing geometry of cylinders 51 in the monolayer. The cylinders 51 appear as squares visible through transparent upper surface 55. The centers of cylinders 51 form a square pattern, as shown by exemplary square S.

The projected areas of cylinders 51 in the plane of surface 55 preferably cover as much of the total area of the plane of surface 55 as possible. To this end, cavities 53 preferably are made as small as possible, ideally no larger than the cylinders themselves (or as close to this ideal as is consistent with proper cylinder rotation). The greater the ratio between the sum of the projected areas of the cylinders in the plane of viewing surface 55 and the total area of viewing surface 55, the greater the display reflectance and the brighter the display. It will be appreciated that, whereas the maximum areal cover age theoretic ally possible with spherical bichromal balls (of a single uniform diameter, without interstitial smaller balls) is about 90.7 percent, the maximum for bichromal cylinders is 100 percent. Thus a gyricon display made from a close-packed monolayer of cylinders according to the invention can be made brighter than a gyricon display made from a close-packed monolayer of spherical balls.

Figure 6:
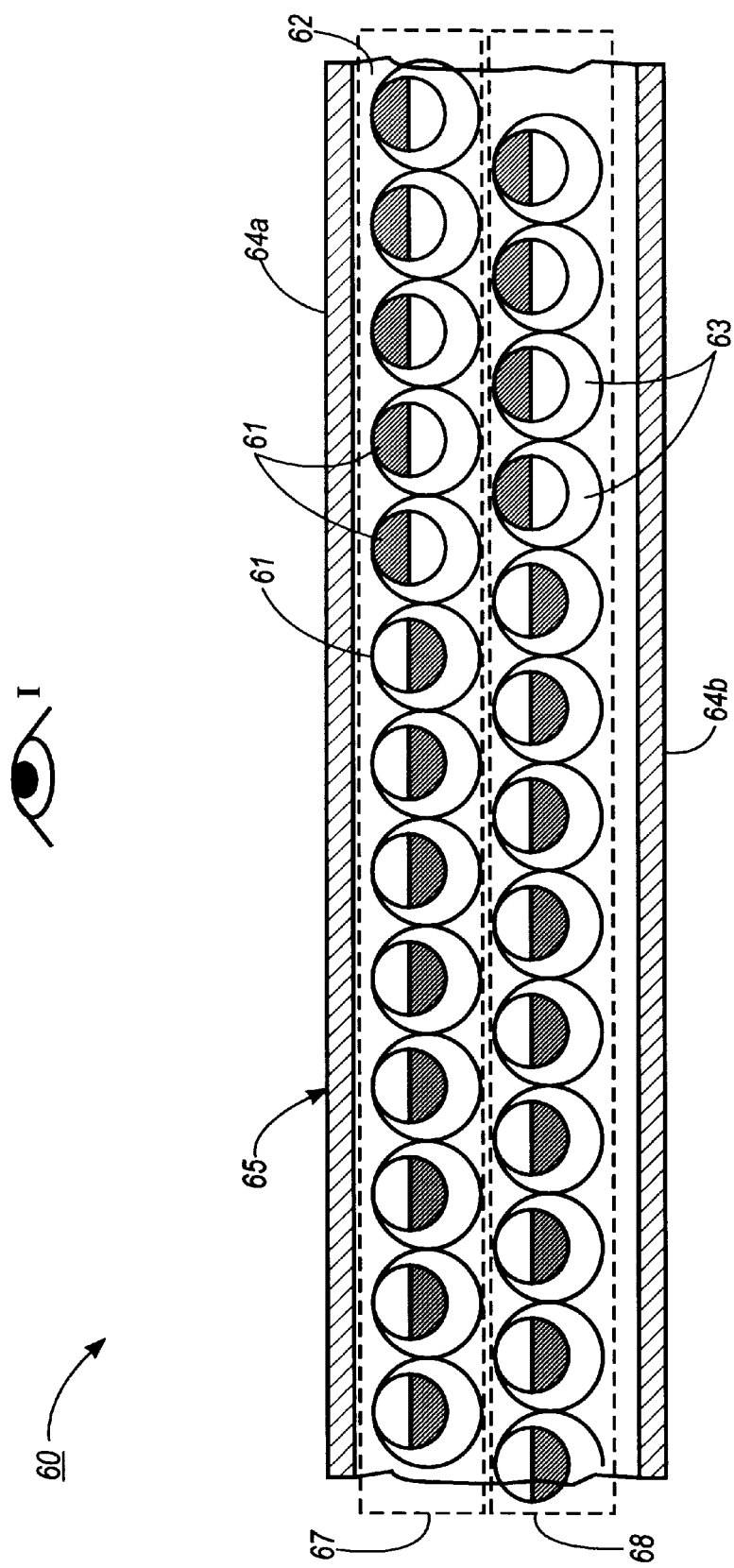
FIG. 6 is a side view of a gyricon display of the present invention in an alternative, embodiment wherein the bichromal cylinders are arrayed in a multilayer configuration, with relatively large cavity size.

FIG. 6 shows a side view of a gyricon display 60 of the invention in an alternative embodiment. In display 60, bichromal cylinders 61 are in a top layer 67 and additional lower layers (here represented by second layer 68). Elastomer substrate 62 is swelled by a dielectric fluid (not shown) creating cavities 63 in which the cylinders 61 are free to rotate. Cylinders 61 are electrically dipolar in the presence of the dielectric fluid and so are subject to rotation upon application of an electric field, as by matrix-addressable electrodes 64a, 64b. The electrode 64a closest to upper surface 65 is preferably transparent. An observer at I sees an image formed by the black and white pattern of the cylinders 61 as rotated to expose their black or white faces to the upper surface 65 of substrate 62.

To improve the brightness of display 60 so that it is comparable to the brightness of display 60 (of FIGS. 5A–5B), the top layer 67 can be made close-packed, with packing geometry and reflectance characteristics similar to those of the close-packed monolayer of cylinders 51 in display 50. In this case, cavities 63 are made as small as possible with respect to cylinders 61, and particularly with respect to cylinders in top layer 67, so that these cylinders nearly fill the cavities. Also, cavities 63 are placed as close to one another as possible, so that the cavity walls are as thin as possible. Preferably, cylinders in top layer 67 are of uniform diameter and are situated at a uniform distance from upper surface 65. It will be appreciated that if top layer 67 is close-packed, almost all the light reflected from display 60 so as to be observable to an observer at I is reflected from the white faces of cylinders in top layer 67. At least for top layer 67, the arrangement of cylinders 61 and cavities 63 in display 60 minimizes both the center-to-center spacing and the surface-to-surface spacing between neighboring bichromal cylinders. Cylinders in the lower layers (such as layer 68) can also be close-packed in order to reduce overall display thickness.

In general, a monolayer display, such as display 50 of FIGS. 5A–5B, is preferable to a thicker display, such as display 60 of FIG. 6. This is because a thinner display can operate with a lower drive voltage, which affords concomitant advantages such as reduced power consumption, improved user safety, and the possibility of less expensive drive electronics. Further, a thinner display can offer better resolution than a thicker one, due to reduced fringing fields between adjacent black and white pixels. A thicker display offers fringing fields a greater volume in which to develop, and bichromal cylinders caught in the fringing fields are partially but not fully rotated so that they present a mix of black and white to the observer. Consequently, the display appears gray in the fringing field regions. The thin display has minimal fringing fields, and so provides a sharp demarcation between adjacent black and white pixels. (A more detailed discussion of fringing fields in thick and thin gyricon displays, and the effects of these fields on display resolution, is given in U.S. Pat. No. 5,754,332 with reference to FIG. 14 and the accompanying text therein.)

Although it is preferred to align the cylinders end-to-end and side-to-side within the monolayer (or top layer) of the display, so as to form a rectangular array, in alternative embodiments other arrangements of cylinders within the layer can be used. Some examples are seen in FIGS. 7–8.

Figure 7:
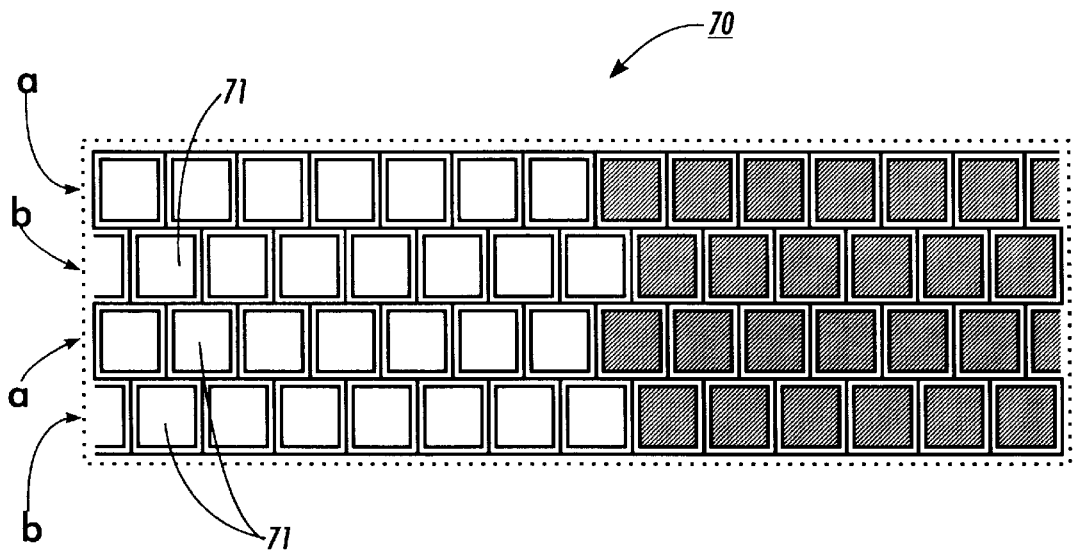
FIGS. 7–8 illustrate top views of gyricon displays of the present invention in alternative embodiments in which the cylinders are, respectively, staggered in their alignment or randomly oriented.

FIG. 7 illustrates a top view of gyricon display 70 of the present invention in an alternative embodiment in which neighboring rows a, b of cylinders 71 are staggered with respect to one another. That is, the cylinders in rows a are aligned end-to-end with each other, as are the cylinders in alternate rows b, but the cylinders in rows a are not aligned side-to-side with those in rows b. The arrangement of FIG. 7 covers the plane as completely as the arrangement of FIG. 5B; however, the arrangement of FIG. 5B can be preferable, because this arrangement produces a well-defined rectangular array of pixels for pixels as small as a single cylinder.

Figure 8:
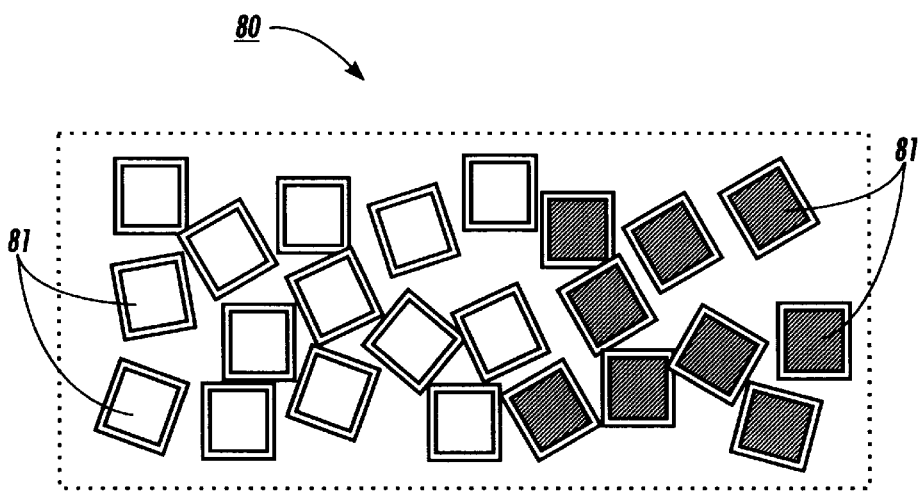

FIG. 8 illustrates a top view of gyricon display 80 of the present invention in an alternative embodiments in which cylinders 81 are in random orientations with respect to one another. That is, the longitudinal axes of cylinders 81 are not parallel to one another. This arrangement of cylinders covers the plane less completely than the arrangements shown in FIG. 5B and FIG. 7, and so is less preferable from the standpoint of maximizing display reflectance.

Figure 9:
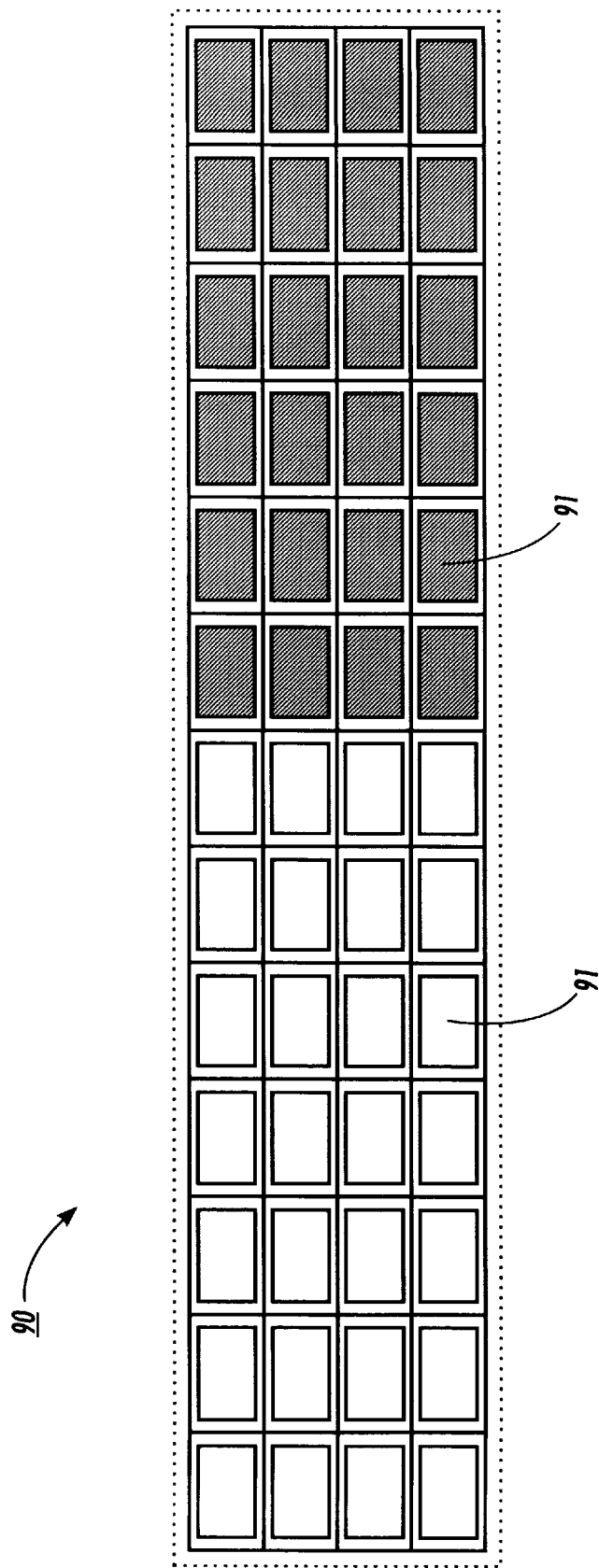
FIG. 9 illustrates a top views of gyricon display of the present invention in an alternative embodiment in which the cylinder aspect ratio is greater than 1:1.

FIG. 9 illustrates a top views of gyricon display 90 of the present invention in an alternative embodiment in which the aspect ratio of the cylinders 91 is greater than 1:1. This alternative embodiment covers the plane comparably with the arrangements of FIG. 5B and FIG. 7. It can be useful, for example, in situations where different display resolutions are desired in the x- and y-dimensions (e.g., a display having a resolution of 1200 by 300 dots per inch).

Figure 10:
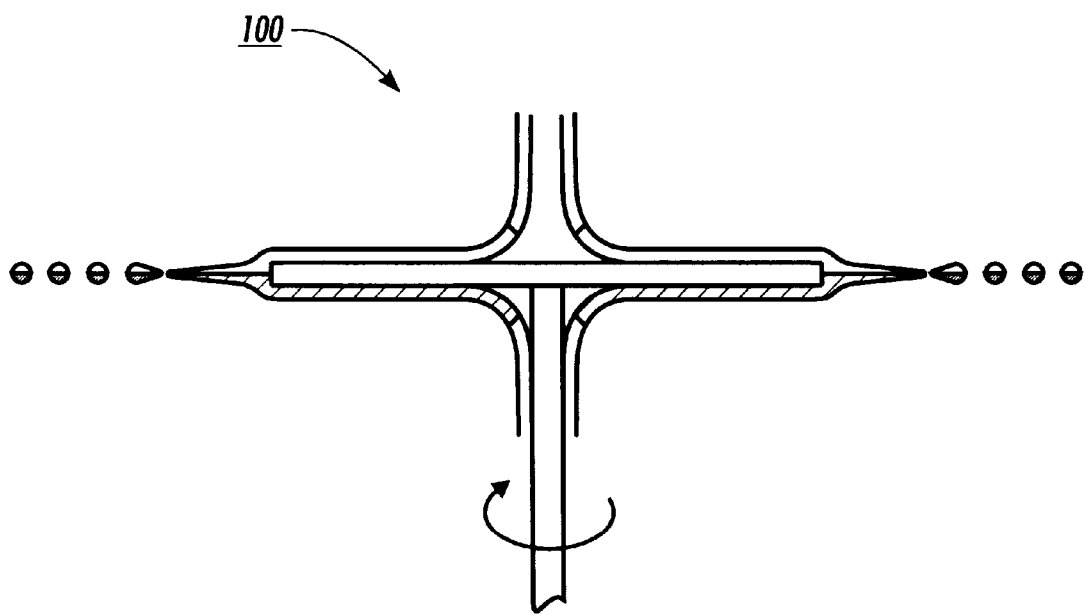
FIG. 10 illustrates a side view of a spinning-disk mechanism for fabrication of bichromal balls in the PRIOR ART.

Cylinder Fabrication Techniques FIG. 10 (PRIOR ART) illustrates a side view of a spinning-disk mechanism 100 for fabrication of bichromal spherical balls. Mechanism 100 is equivalent to the "spinning disc configuration 50" disclosed in the '098 patent incorporated by reference hereinabove; see FIG. 4 therein and the accompanying description at col. 4, line 25 to col. 5, line 7.

In the prior art, the spinning disk mechanism was used in conjunction with low-viscosity hardenable liquids. Low viscosity was considered necessary to ensure the formation of good-quality bichromal spheres; if viscosity was too high, the ligaments streaming off the disk would freeze in place instead of fragmenting into balls as desired. For example, as stated in the '098 patent (col. 5, line 64–col. 6 line 2), "the black and white pigmented liquids are delivered . . . in a heated, molten state . . . so that they flow freely and do not harden prematurely, i.e., long enough to prevent the ligaments from freezing."

Figure 11:
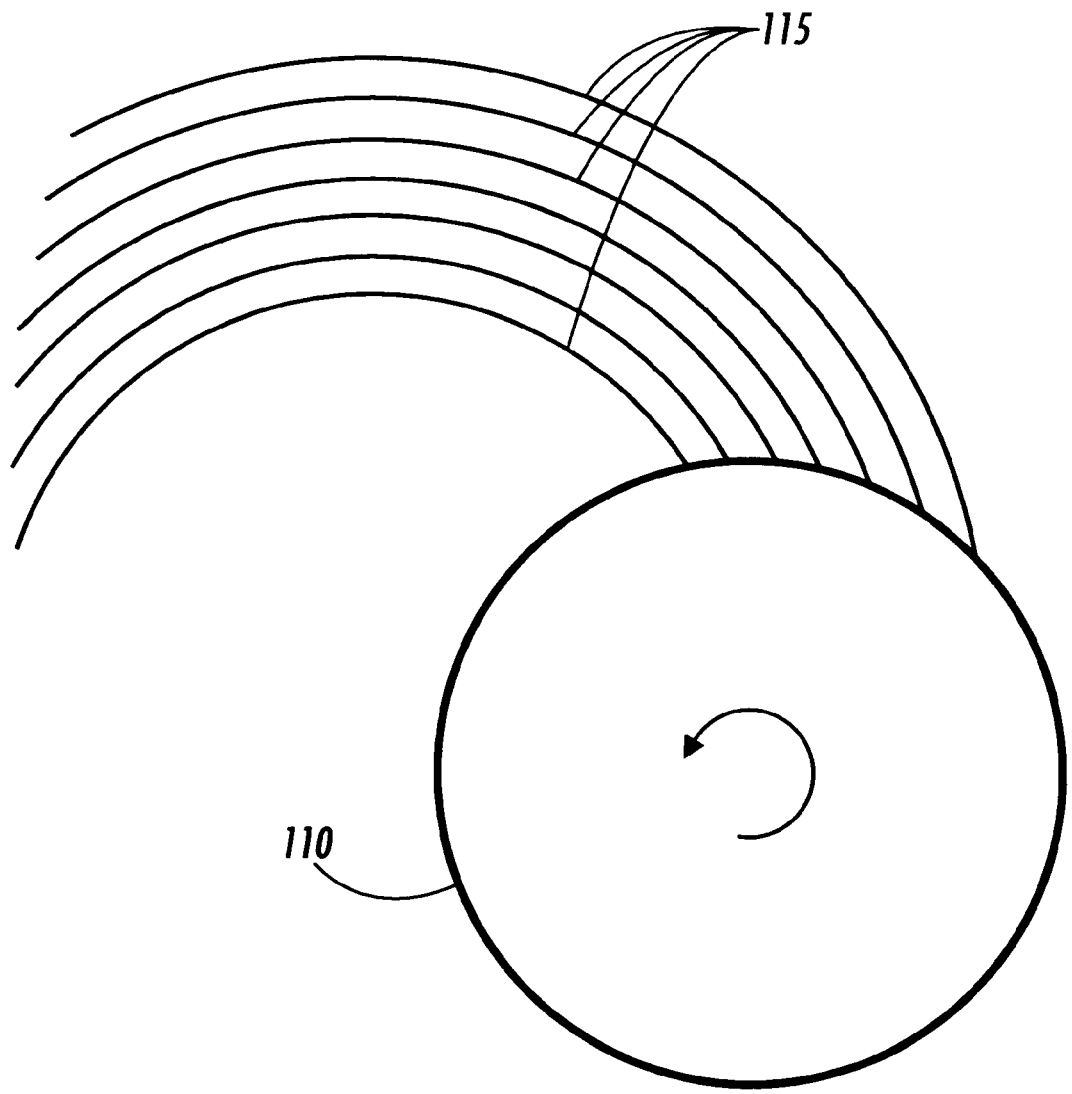
FIG. 11 illustrates a top view of a spinning-disk mechanism for fabrication of bichromal cylinders of the invention.

According to the invention, the spinning disk mechanism is used in conjunction with high-viscosity hardenable liquids. These liquids do, indeed, "freeze" (harden) in place, the very result not desired in the prior art. However, according to the invention the frozen ligaments that are considered undesirable for making bichromal spheres can be used to make bichromal cylinders. FIG. 11 illustrates this. A spinning disk 110, shown here in a top view, is used according to the technique of the '098 patent to form bichromal ligaments, but with high-viscosity hardenable white and black liquids being used in place of the low-viscosity liquids of the prior art. The resulting ligaments 115 harden into fine bichromal filaments (roughly analogous to the way in which molten sugar hardens into filaments when spun in a cotton candy machine). The filaments can be combed or otherwise aligned and then cut into even lengths, as with a tungsten carbide knife or a laser, to produce the desired bichromal cylinders. End-to-end and side-to-side alignment of the cut cylinders can be achieved by precise alignment of the filament ends on the working surface where the cutting takes place; for example, if the cylinders are to have aspect ratio 1:1 and diameter 100 microns, then the filament ends can be aligned with one another to within a tolerance on the order of 5 to 10 microns.

Alternative techniques can also be used to produce the bichromal cylinders. For example, injection molding can be used, albeit perhaps with some inconvenience. As another example, the bichromal jet technique disclosed in the '594 patent can be used, again substituting high-viscosity hardenable liquids for the usual low-viscosity liquids.

No-Cavities Cylinder Display

In a gyricon display made with swelled elastomer, each bichromal cylinder is situated in a cavity. To achieve the closest possible packing of bichromal cylinders in such a display, the cavities are preferably made as small and as close together as possible.

To achieve still higher packing density, a gyricon display can be constructed without elastomer and without cavities. In such a display, the bichromal cylinders are placed directly in the dielectric fluid. The cylinders and the dielectric fluid are then sandwiched between two retaining members (e.g., between the addressing electrodes). There is no elastomer substrate. In this case, the packing geometry can closely approach, or even achieve, the ideal close-packed monolayer geometry shown in FIG. 4.

Figure 12:
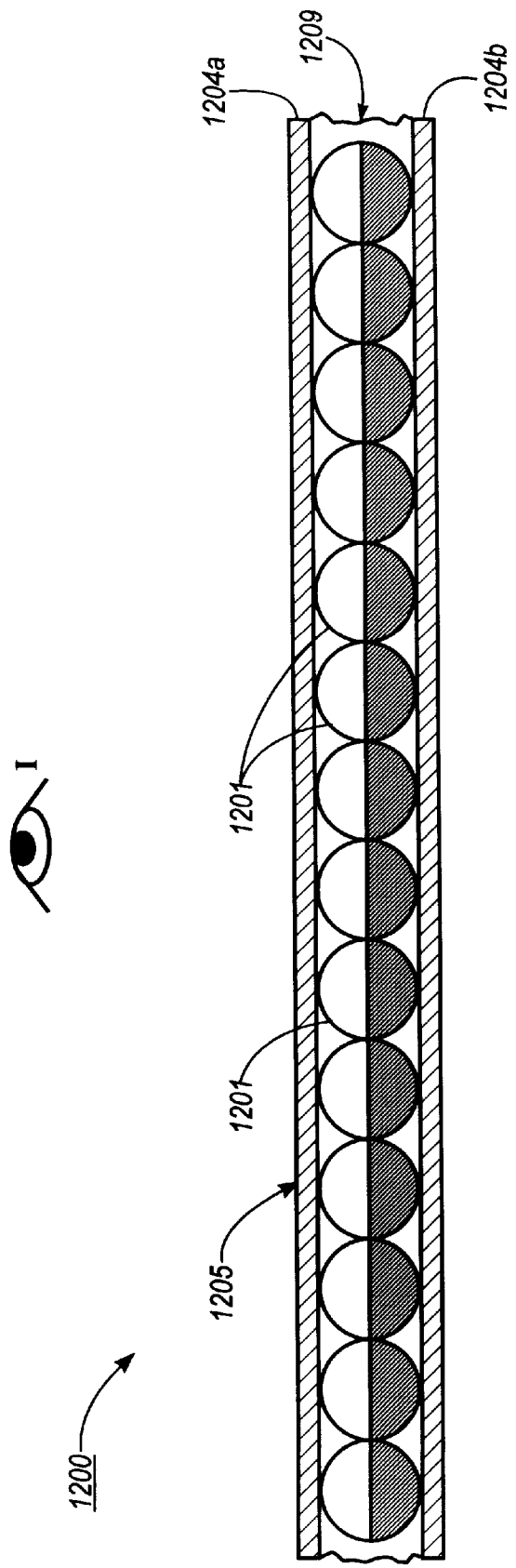
FIG. 12 illustrates an alternative embodiment of the gyricon display of the invention wherein there is no elastomer or other cavity-containing substrate to retain the monolayer of cylinders in place.

FIG. 12 illustrates a side view of a no-cavities gyricon display. In display 1200, a monolayer of bichromal cylinders 1201 of uniform diameter is situated in dielectric fluid 1209 between matrix-addressable electrodes 1204a, 1204b. Preferably cylinders 1201 of unit aspect ratio are arranged in a rectangular array, aligned end-to-end and side-to-side within the monolayer and packed as close together as is possible consistent with proper cylinder rotation. Cylinders 1201 are electrically dipolar in the presence of dielectric fluid 1209 and so are subject to rotation upon application of an electric field, as by electrodes 1204a, 1204b. The electrode 1204a closest to upper surface 1205 is preferably transparent. An observer at I sees an image formed by the black and white pattern of the cylinders 1201 as rotated to expose their black or white faces to the upper surface 1205 of display 1200.

Electrodes 1204a, 1204b serve both to address cylinders 1201 and to retain cylinders 1201 and fluid 1209 in place.

Preferably the spacing between electrodes 1204a, 1204b is as close to the diameter of cylinders 1201 as is possible consistent with proper cylinder rotation. Cylinders 1201 and fluid 1209 can be sealed in display 1200, for example by seals at either end of the display (not shown). The close packing of cylinders 1201 in the monolayer, together with the close spacing of the electrodes 1204a, 1204b, ensures that cylinders 1201 do not settle, migrate, or otherwise escape from their respective positions in the monolayer.

Conclusion

A new gyricon display based on cylindrical elements instead of spherical elements has been described. This new display makes possible a close-packed monolayer providing nearly 100 percent a real coverage. Such a display provides superior reflectance and brightness, and requires no interstitial particles.

The foregoing specific embodiments represent just some of the possibilities for practicing the present invention. Many other embodiments are possible within the spirit of the invention. For example:

The electrical anisotropy of a gyricon cylinder need not be based on zeta potential. It is sufficient that there is an electrical dipole moment associated with the cylinder, the dipole moment being oriented with respect to the long axis of the cylinder in such a way as to facilitate a useful rotation of the cylinder in the presence of an applied external electric field. (Typically, the dipole moment is oriented along a medial axis of the cylinder.) Further, it should be noted that a gyricon cylinder can have an electrical monopole moment in addition to its electrical dipole moment, as for example when the dipole moment arises from a separation of two positive charges of different magnitudes, the resulting charge distribution being equivalent to a positive electrical monopole superposed with a electrical dipole.

The optical anisotropy of a gyricon cylinder need not be based on black and white. For example, bichromal cylinders having hemispheres of two different colors, e.g. red and blue, can be used. As another example, cylinders that are black in one hemisphere and mirrored in the other might be used for some applications. In general, various optical properties can vary as different aspects of a gyricon cylinder are presented to an observer, including (but not limited to) light scattering and light reflection in one or more regions of the spectrum. Thus the gyricon cylinders can be used to modulate light in a wide variety of ways.

The incident light that encounters a gyricon display need not be restricted to visible light. Given suitable materials for the gyricon cylinders, the incident "light" can be, for example, infrared light or ultraviolet light, and such light can be modulated by the gyricon display.

On several occasions the foregoing description refers to a planar monolayer of bichromal cylinders. However, persons of skill in the art will appreciate that a gyricon display (or a sheet of bichromal cylinders for use in such a display) made of a flexible material can be temporarily or permanently deformed (for example, flexed, folded, or rolled) so as not to be strictly planar overall. In such cases, the plane of a monolayer can be defined, for example, in a locally planar neighborhood that includes the gyricon cylinder or cylinders of interest. Also, it will further be appreciated that in practice the monolayer can vary somewhat from what has been described, for example, due to manufacturing tolerances or slight imperfections of particular gyricon sheets.

Accordingly, the scope of the invention is not limited to the foregoing specification, but instead is given by the appended claims together with their full range of equivalents.

We claim:

1. A material comprising:
  a substrate; and
  a plurality of substantially cylindrical optically anisotropic particles disposed in the substrate, a rotatable disposition of each particle being achievable while said particle is thus disposed in the substrate, said particle, when in said rotatable disposition, not being attached to the substrate.

2. The material of claim 1 wherein each particle has a plurality of component regions giving rise to said particle's optical anisotropy, the regions including a first region having a first optical modulation characteristic and a second region having a second optical modulation characteristic.

3. The material of claim 2 wherein:
  each of the substantially cylindrical particles has a longitudinal axis;
  the first and second regions of each particle are substantially hemicylindrical regions joined by a substantially planar interface therebetween, the substantially planar interface substantially including the longitudinal axis of the particle; and
  the rotatable disposition achievable for each particle is a rotatable disposition that facilitates rotation about the longitudinal axis of the particle.

4. The material of claim 2 wherein the first component region of each particle is optically reflective and the second component region of each particle is optically absorptive.

5. The material of claim 1 wherein:
  the substrate has a surface, the surface having an area;
  each of the substantially cylindrical particles has a longitudinal axis; and
  the plurality of particles includes a set of particles situated closest to the substrate surface, the particles of the set forming substantially a single layer wherein the particles are disposed with their longitudinal axes substantially parallel to the layer,
    each particle in the layer having a center point, substantially no particle in the layer being disposed entirely behind the center point of any nearest neighboring particle in the layer with respect to the substrate surface,
    each particle in the layer having a projected area with respect to the substrate surface, the particles of the set being sufficiently closely packed with respect to one another in the layer that the union of their projected areas exceeds two-thirds of the area of the substrate surface.

6. The material of claim 1 wherein the particles
  each of the substantially cylindrical particles has a longitudinal axis; and
  the plurality of particles are disposed in a closely packed monolayer wherein the particles are disposed with their longitudinal axes substantially parallel to the monolayer and substantially parallel to one another.

7. The material of claim 6 wherein:
  the substrate has a surface having an area;
  each particle has a projected area with respect to the substrate surface; and
  the particles are sufficiently closely packed that the sum of their projected areas exceeds two-thirds of the area of the substrate surface.

8. The material of claim 1 wherein each particle has an anisotropy for providing an electrical dipole moment, the electrical dipole moment renderig the particle electrically responsive such that when the particle is rotatably disposed in an electric field while the electrical dipole moment is provided, the particle tends to rotate to an orientation in which the electrical dipole moment aligns with the electrical field.

9. Apparatus comprising:

a piece of the material recited in claim 8; and means for producing an electric field to facilitate a rotation of at least one particle rotatably disposed in the substrate of the piece of material.

10. The material of claim 1 wherein the particles are disposed in a monolayer.

11. The material of claim 10 wherein the particles are arranged in a single layer such that the longitudinal axes of the particles are substantially parallel to the layer and substantially parallel to one another.

12. The material of claim 11 wherein the particles are disposed in a closely packed monolayer.

13. The material of claim 11 wherein:

each particle has first and second ends; and the particles of the layer are disposed in a rectangularly packed array of particles,
the first ends of adjacent particles of the array being substantially aligned with one another,
the second ends of adjacent particles of the array being substantially aligned with one another.

14. The material of claim 1 wherein the particles are disposed in a closely packed arrangement.

15. The material of claim 14 wherein the particles are sufficiently closely packed that each particle comes as close as possible to touching said particle's nearest neighboring particles.

16. The material of claim 1 wherein the particles are rotatable in the substrate.

17. The material of claim 1 wherein the substrate comprises an elastomer that ban be expanded by application of a fluid thereto so as to render the particles rotatable therein.

18. Apparatus comprising:

a piece of the material recited in claim 1 and means for facilitating a rotation of at least one particle rotatably disposed in the substrate of the piece of material.

19. Apparatus comprising:

a member having an optically transmissive viewing surface;

a plurality of substantially cylindrical optically anisotropic particles rotatably disposed behind the viewing surface with respect to an observer situated favorably to observe the viewing surface, at least some of the particles thus being observable by the observer through the viewing surface, each particle having an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field;

means for keeping in place with respect to the viewing surface the particles thus disposed; and means for facilitating a rotation of at least one of the particles thus disposed by selectively applying an electric field to a particle for which the electrical dipole moment is provided.

20. The apparatus of claim 19 wherein the means for keeping the particles in place comprises a substrate in which the particles are rotatably disposed.

21. A material comprising:

a substrate having a surface, the surface having an area; and a plurality of substantially cylindrical optically anisotropic particles disposed in the substrate substantially in a single layer, the particles being of a substantially uniform size characterized by a linear dimension d, each particle having a center point, each pair of nearest neighboring particles in the layer being characterized by an average distance D therebetween, said distance D being measured between particle center points, a rotatable disposition of each particle being achievable while said particle is thus disposed in the substrate, said particle, when in said rotatable disposition, not being attached to the substrate, the particles being sufficiently closely packed with respect to one another in the layer such that the ratio of the union of the projected areas of the particles to the area of the substrate surface exceeds the a real coverage fraction that would be obtained from a comparably situated layer of spheres of diameter d disposed in a hexagonal packing arrangement with an average distance D therebetween as measured between sphere centers.

22. The material of claim 21 wherein the ratio D/d is made as close to 1.0 as practicable, whereby the ratio of the union of the projected areas of the particles to the area of the substrate surface exceeds the maximum theoretically possible a real coverage fraction for a maximally close-packed hexagonal packing geometry of a layer of spheres of diameter d, said maximum theoretically possible a real coverage fraction being approximately equal to 90.7 percent.

* * * * *